United States Patent [19]

Smith et al.

[11] Patent Number: 4,832,379
[45] Date of Patent: May 23, 1989

[54] COLLET GRIP RISER FITTING

[75] Inventors: Edward B. Smith, Westlake; William B. Smith, Berea; Elmer V. Rogers Jr., North Olmstad; John A. Spisak, Avon, all of Ohio

[73] Assignee: The Pipe Line Development Company, Westlake, Ohio

[21] Appl. No.: 7,797

[22] Filed: Jan. 28, 1987

[51] Int. Cl.[4] ............................................. F16L 23/00
[52] U.S. Cl. ..................................... 285/323; 285/343; 285/368; 285/369; 29/157 R
[58] Field of Search ............... 285/368, 343, 323, 369; 29/157 R

[56] References Cited

U.S. PATENT DOCUMENTS

| 455,178 | 6/1891 | Dillenburg | 285/343 |
| 2,070,855 | 2/1937 | Bronsell | 285/368 |
| 3,387,867 | 6/1968 | Rogers | 285/368 X |
| 3,414,297 | 12/1968 | Pollia | 285/368 X |
| 3,498,647 | 3/1970 | Schroder | 285/343 |
| 4,000,921 | 1/1977 | Daspit | 285/368 X |
| 4,127,289 | 11/1978 | Daspit | 285/348 X |
| 4,138,145 | 2/1979 | Lawrence | 285/343 X |
| 4,239,266 | 12/1980 | Mynhier | 285/348 X |
| 4,413,845 | 11/1983 | Lawrence | 285/368 X |
| 4,457,541 | 7/1984 | Kelly et al. | 285/342 X |

FOREIGN PATENT DOCUMENTS 350608 3/1922 Fed. Rep. of Germany ...... 285/368

Primary Examiner—Thomas F. Callaghan
Attorney, Agent, or Firm—Pearne, Gordon, McCoy & Granger

[57] ABSTRACT

A coupling assembly for mechanically coupling the plain end of a pipe, comprising a pair of standard forged flanges as basic components between which is disposed a wedge ring. One of the flanges is of the slip-on type and has associated with it a conical collet bore for receiving the wedge ring. When tension bolts assembled through the flanges are tightened the wedge ring is driven into the collet bore and tightly radially against the periphery of the pipe to thereby lock the coupling to the pipe.

10 Claims, 1 Drawing Sheet

COLLET GRIP RISER FITTING

BACKGROUND OF THE INVENTION

The invention relates to couplings for pipe lines and, more particularly, to fittings for mechanically coupling plain pipe ends.

PRIOR ART

The repair of existing pipe systems often requires a pipe to be cut off at some point along its length and joined with a replacement length of pipe. In many cases, depending on such factors as the environment of the pipe, it is not practical to couple the new length by welding. An example of a frequently needed repair is a vertical section of riser in an off shore gas or oil line. The high frequency of repair in this type of service is the result of corrosion of the line at the water surface due to effects of salt water, air and wave action. These effects accelerate the corrosion of the line at this area and cause it to need replacement substantially earlier than that of underwater sections.

U.S. Pat. Nos. 4,127,289 to Daspit and 4,239,266 to Mynhler disclose examples of mechanical "collet" type pipe-couplings suggested for underwater use. Typically such couplings incorporate wedges or "slips" which circumferentially grip the pipe. The wedges are tightened by axial bolts which, as they are tightened, cause the wedges to be cammed radially inwardly against the pipe. In general, known types of these couplings can be relatively expensive to manufacture, complicated to assemble and install, and bulky in size.

SUMMARY OF THE INVENTION

The invention provides a collet type pipe fitting assembly and a method of its manufacture which employs a pair of opposed flanged pipe fitting elements as basic components. The flanged fitting elements, in accordance with the invention, can be fabricated by machining or otherwise altering standard pipe flanges to provide a collar for receiving circumferentially arranged wedge elements and/or a seat for a circumferential packing ring. In alternative arrangements, a standard pipe flange can be used to carry a separately formed collet.

The disclosed couplings afford signficant reductions in manufacturing costs since the standard flange components are regular articles of commerce that are produced in quantity. This makes it practical for the flanges to be forged of premium material and to be machined with relatively low unit labor and tooling costs.

Alteration of standard flanges, in accordance with the invention, involves simple turning, boring or like operations to form the collet socket and/or the packing ring seat. Besides the wedge elements and the packing rings, the coupling requires few, if any, additional custom manufactured elements. Such additional elements, typically, are annular parts of limited geometric complexity which are relatively inexpensive to produce.

In one embodiment, the coupling assembly comprises a slip-on flange and an opposed welding neck flange. The coupling assembly is used to join a length of pipe welded to the welding neck flange, to another pipe section terminating with a plain end. A separately formed collet is piloted on the raised face of the slip-on flange. The coupling face of the welding neck flange is machined with a counterbore that forms a seat for a circumferential packing ring and receives the plain end of the opposite pipe section. A wedge ring is interposed between the collet and the packing ring. Tension bolts are assembled axially through bolt holes in the flanges. The bolts are drawn tight to radially constrict the wedge ring against the exterior of the pipe end section on which the slip-on flange is positioned to thereby lock the coupling onto this section. Axial forces developed by the bolts also compress the packing in the seat and thereby cause it to constrict radially about the pipe to effect a seal.

In another embodiment of the invention, the coupling is adapted to mechanically join two plain pipe ends together. The coupling includes a pair of opposed spaced slip-on flanges. Disposed between the slip-on flanges is a center ring having oppositely facing packing ring seats. Interposed between each slip-on flange and the center ring is a separate wedge ring member. Tension bolts, assembled through aligned holes in both of the slip-on flanges, are tightened to simultaneously clamp both wedge rings onto the pipe ends which they encircle. At the same time, bolt tension forces cause packing rings to constrict radially into sealing contact with the pipe ends to effect a fluid tight connection.

DESCRIPTION OF THE PREFERRED EMBODIMENTS

Figure 1:
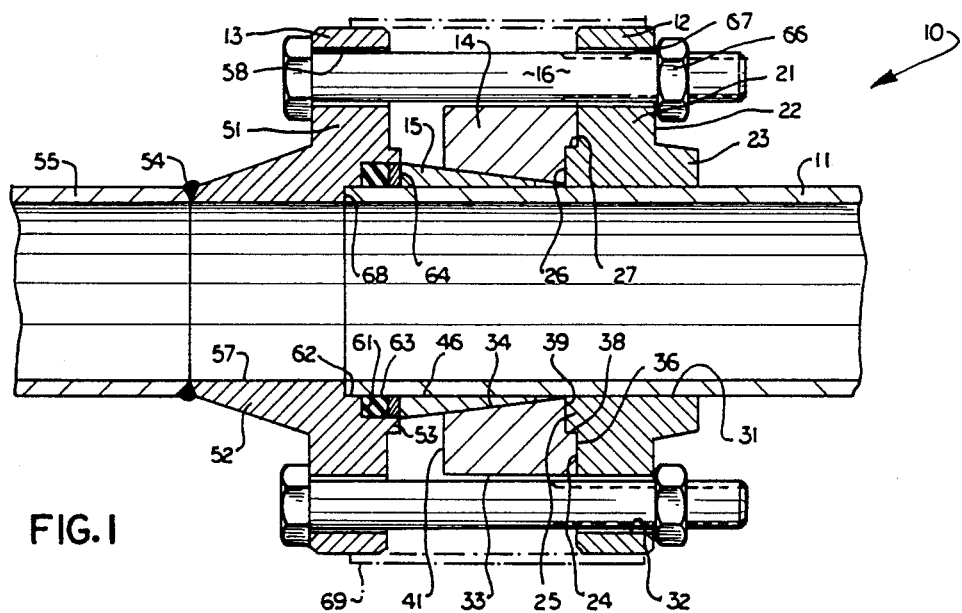
FIG. 1 is a cross sectional view taken in an axial plane of a coupling assembly constructed in accordance with the invention.

Referring now to FIG. 1, there is shown a coupling assembly 10 suitable for use in making a fluid tight mechanical joint with a plain end of a pipe 11. The coupling includes a pair of opposed spaced flanges 12, 13 between which are interposed a collet 14 and a wedge collar 15. The flanges 12, 13 are held axially together by tension bolts 16.

Ideally the flange 12 if a forged slip-on flange available as a standard article of commerce produced by numerous manufacturers in the industry according to Americam Standards Association (ASA Standard B16.5). The flange 12 is forged, for example, of steel, wrought iron, alloy steel, stainless steel or aluminum. The flange 12 has a generally circular or disc-like main body 21. At one face 22 the flange 12 has an annular hub 23 extending axially from the main body section 21. At an opposite face 24, the flange 12 has an annular raised face section 25 including a machined circular radial face 26 and a machined cylindrical surface 27. The axial length of the raised face section 25 is conventionally substantially shorter than the length of the hub portion 23.

A cylindrical bore 31 is machined along the length of the flange 12 concentric with its axis. The diameter of the bore 31 is dimensioned to provide a slip fit over the outside diameter of the pipe 11 to be coupled. A plurality of axial bolt holes 32 are drilled or otherwise formed adjacent the outer periphery of the flange body 21. The holes 32 are equally spaced from the axis of the flange 12 and are equally spaced angularly from one another.

The size and number of the bolt holes 32 is standardized and depends on the nominal size of the pipe 11.

The collet 14 is a circumferentially continuous collar formed out of steel or other material like or similar to that of the flange 12. Preferably an outer cylindrical surface 33 of the collet 14 has a radius less than the minimum distance of the bolt holes 32 from the axis of the coupling so that there is no interference between the collet 14 and bolts 16. The collet 14 has a conical bore 34 concentric with its axis. In the illustrated case the minor diameter of the bore is generally equal to the bore of the slip-on flange 12 so that the collet 14 can be readily slipped over the pipe 11. At one end face 36 associated with the minimum diameter of the bore 34, the collet 14 has a shallow axial counter-bore with a cylindrical surface 38 and a radial surface 39. The axial spacing of the radial surface 39 from the end face 36 and the diameter of the cylindrical surface 38 to allow the collet 14 to be piloted on the raised face 25 of the flange 12. At an opposite face 41, the collet 14 is conveniently formed with a radial surface.

Figure 2:
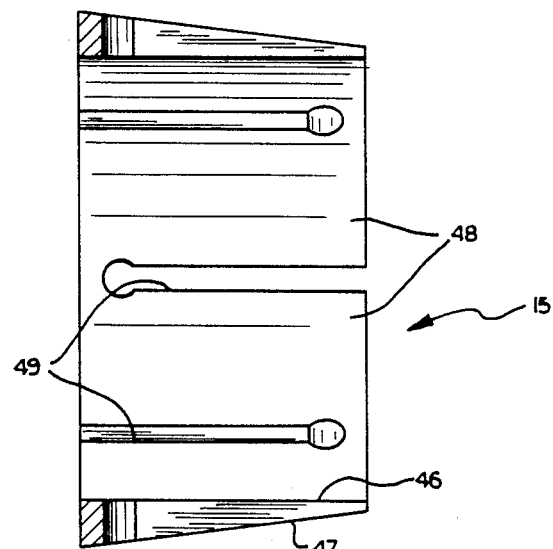
FIG. 2 is a cross sectional view taken in an axial plane of a wedge ring of the coupling of FIG. 1.

Assembled between the collet 14 and the welding neck flange 13 is the wedge collar or ring 15. The wedge collar 15 has a free inside cylindrical surface or bore 46 sized to slip over the pipe 11 and a concentric conical outer surface 47. The cone angle of the outer surface 47 is substantially equal to that of the collet bore 34. This angle may be in the order of 7°, for example. In its free state, the outer conical ring surface 47 is proportioned such that a substantial part of its axial length is received in the collet bore 34. As indicated in FIG. 2, the wedge ring 15 is slotted through its radial thickness along axial lines equally spaced about its periphery. Successive slots 49 around the periphery are cut from alternate end faces 36, 41 of the ring 15 in a manner which divides the ring into a plurality of elements 48 between the slots but leaves the ring in a single piece with a serpentine character. The wedge ring 15 is preferably made of alloy steel or other suitable materials.

The flange 13 is preferably fabricated from a forged welding neck flange available, like the flange 12, as a standard article of commerce produced by a number of manufacturers in the industry according to ASA Standards. The flange may be fabricated of the same or similar material as that of the flange 12. The flange 13 has a generally circular disc-like main body 51, a conical annular hub or neck 52 and a raised face section 53. The outward end of the neck 52 is beveled at 54 for purposes of receiving a weld bead when the flange 13 is joined to a similarly beveled end of a pipe 55. The flange 13 has an axial bore 57 of a diameter generally equal to that of the pipes 11, 55. The main flange body 51 is drilled with axial holes 58 about its periphery in a pattern that matches the holes 32 in the opposed flange 12.

The geometry of the flange 13 described above coincides with an industry standardized forged welding neck flange. This standard welding neck flange is modified, in accordance with the invention, by machining an annular packing cavity or seat 61 in the raised face section 53 concentric with the flange axis. The diameter of this cavity 61 is somewhat larger than the outside diameter of the pipe and the axial length of the cavity is somewhat greater than that of the wall thickness of the pipe. The standard flange is further modified by machining another annular recess or cavity 62 axially inward of the packing cavity 61. This second recess 62, which is also concentric with the axis of the fitting, has a diameter substantially equal to that of the bore 31 of the opposed flange 12 so that it can be slipped on the end of the pipe 11.

Disposed in the packing cavity 61 is a ring of sealing material of packing 63. This material 63 is preferably an elastomeric material known in the art and compatible with the fluid carried in the pipes 11, 55. Where desired, it is contemplatd that a series of thinner rings rather than the single ring 63 can be stacked axially in the cavity 61 to provide necessary sealing capacity.

A circumferentially continuous ring 64 is disposed in the cavity 61 between the packing 63 and the wedge ring 15. The ring 64 has an inside diameter dimensioned to slide on the pipe 11 and an outside diameter to slide in the packing cavity 61. The major diameter of the wedge ring 15 is preferably slightly less than the outer diameter of this push ring 64 so that it can readily follow the push ring into the cavity. The push ring 64 is made of steel or other suitable material.

The tension bolts 16 are of a standard type such as a hex head cap type and are mated with hex nuts 66. The length of the bolts 16 is sufficient to extend through both flanges 12, 13 with an allowance for the length of the associated nuts 66 when the flanges are in their relative positions of FIG. 1. The length of the threads, designated 67, is sufficient to allow the nuts 66 to be tightened a measurable distance to draw the flanges 12, 13 together.

When the coupling assembly 10 is used, particularly in adverse situations such as in underwater applications or in weld hazardous conditions, the pipe 55 is ordinarily butt welded to the flange 13 at a point remote from the site of the other pipe 11. This other pipe 11 thus represents a pipe length existing in such adverse situations. A joint between the pipes 11 and 55 is made by assemblying the slip-on flange 12, collet 14, wedge ring 15, push ring 64 and weld neck flange 13 with the packing ring 63 over the end of the pipe 11. It is assumed that the pipe 11 has been freshly cut off to form a plain end and, where necessary, cleaned of any protective coating or corrosion scale in the vicinity of this end. The weld neck flange 13 is advanced over the pipe 11 until a radial end face 68 of the cavity 62 abuts the end of the pipe. The remaining elements are positioned as shown in FIG. 1. Thereafter the bolts 16 are tightened to draw the flanges 12, 13 towards one another. Axial bolt force on the slip-on flange is transferred through the collet 14, wedge ring 15 and push ring 64 to the packing 63. Continued tightening of the bolts 16 causes axial compression and radial extension of the packing 63 into tight sealing engagement with the exterior of the pipe 11. As the resistance to compression of the packing 63 increases, the wedge ring 15 is cammed or wedged radially inwardly by the conical surface 34 of the collet 14. The wedge ring 15 is capable of constricting circumferentially against the pipe 11 because of the circumferentially spaced slots 49. The bolts 16 are tightened until the wedge ring 15 is tightly constricted about the pipe 11 and it develops sufficient friction to adequately lock the pipe against relative axial movement. At this point the coupling 10 is both sealed and mechanically coupled to the pipe 11. Where desired, a protective cylindrical shell 69, shown in phantom in FIG. 1, of steel or other material may be provided to bridge the gap between the flanged bodies 21, 51.

Figure 3:
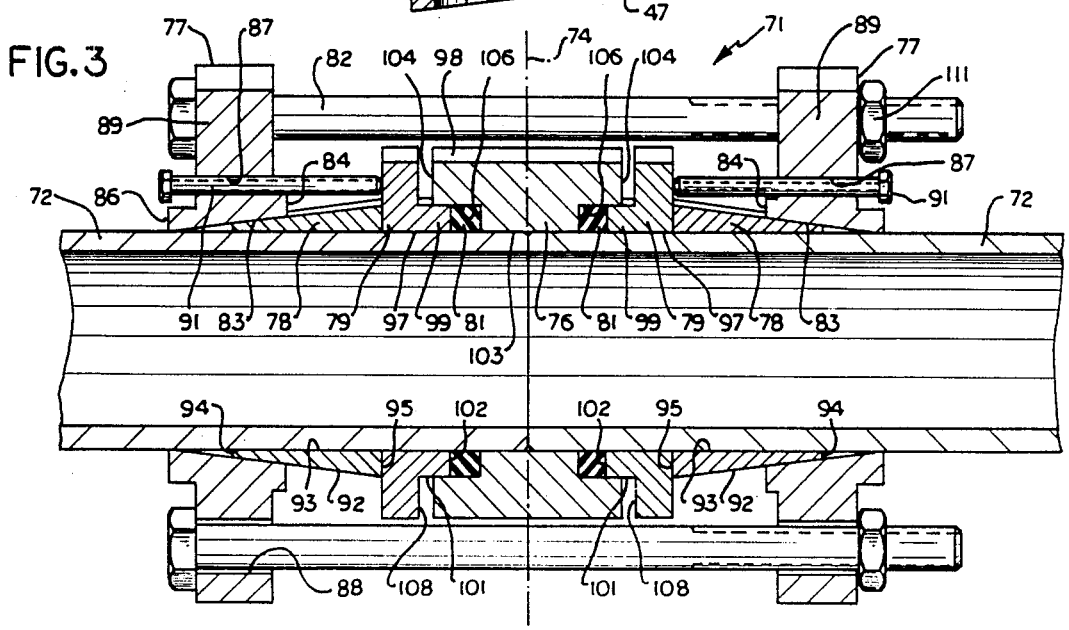
FIG. 3 is a cross sectional view taken in an axial plane of a second embodiment of a coupling assembly, constructed in accordance with the invention, joining two plain pipe ends.

Referring now to FIG. 3, there is shown, in a second embodiment of the invention, a coupling assembly 71 for mechanically joining the plain ends of two pipes 72. The coupling is symmetrical about a mid-plane designated by the broken line 74 which bisects a center ring 76. In addition to the center ring 76, the coupling assembly includes flanges 77, wedge rings 78, push rings 79, packings 81 and tension bolts 82.

Each flange 77 is fabricated from a standard ASA forged slip-on flange identical to the type described above in connection with FIG. 1. The flange 77 is modified from its conventional state by machining in it a conical collet bore 83 concentric with its axis. The cone angle of the bore may be, for example 7°. As shown, the major diameter of the conical bore 83 is associated with a standard raised face section 84. The bore 83 tapers inwardly to a diameter substantially equal to the original standard inside diameter of the flange 77 adjacent an outer end of a hub section 86 of the flange 77. Thus, adjacent the hub 86, the bore 83 provides a slip fit over a pipe 72.

A second modification of the standard flange 77 involves the drilling and tapping of a plurality of axial holes 87 which intervene angularly between standard axial bolt holes 88 in main bodies 89 of the flanges. Thrust screws 91 threaded in the holes 87 extend axially inwardly to bear upon the push rings 79. The tapped holes 87 are disposed at a radius from the center of the flange sufficiently far to avoid interference of the thrust screws with the associated wedge rings 78.

Each ring 78 has a conical exterior surface 92 and a cylindrical bore 93. In a free state, the bore 93 is sized to slip over the exterior of its associated pipe 72. The ring 78 is a single piece unit and is longitudinally slotted alternately from opposite radial end faces 94, 95 in the same manner as the wedge of FIGS. 1 and 2.

The cone angle of the wedge ring 78 is complementary to the angle of the collet bore 83 and the minor end of the exterior of the wedge ring is dimensioned to fit well into the flange collet bore 83.

The push rings 79 each have a cylindrical bore 97 sized to slip over the associated pipe 72. The push rings 79 which are formed of steel or other suitable material have an outer cylindrical surface 98 that lies radially inward of the bolt pattern of the flanges 77. The push rings 79 include annular axial projections 99 facing the center ring 76. The projection 99 has a cylindrical outer surface 101 and a radial end face 102.

The center ring 76 has an axial bore 103 dimensioned to slip over the ends of the pipes 72. At opposite radial faces 104, the ring 76 has counterbores 106 that receive the packing rings 81. The packing material or rings 81 can be formed of elastomeric material known in the art. The counterbores 106 are dimensioned to provide slip fits over the push ring projections 99. The axial length of a projection 99 is sufficient with respect to the depth of the counterbore 106 and axial length of packing ring material 81 to ensure that the push ring 79 can compress the packing ring to a sufficient degree before its radial face 108 abuts the adjacent outer ring face 104. The tension bolts 82 are assembled through angularly aligned bolt holes 88 in the flanges 77.

With the elements of the coupling assembly 71 assembled in a relationship shown in FIG. 3, a pair of plain end pipes 72 can be mechanically coupled together in the following manner. The ends of the pipes 72 are abutted or nearly abutted adjacent the mid-plane 74 of the center ring 76. The tension bolts 82, working with nuts 111, are tightened to draw the opposed flanges 77 together. The bolt tension acts to axially compress the packings 81 and cause these components to extend radially into tight sealing engagement with the exterior of the pipes 72 with which they are associated. Increased resistance to axial compression in the packings 81 causes the wedge rings 78 to be cammed radially inwardly by action of the flange collet bores 83 upon continued converging movement of the flanges 77. The bolts 82 are tightened until the wedge rings 78 are adequately clamped into engagement with the periphery of the pipes 72. Where desired, once the wedge rings 78 have locked onto the exterior of the pipes 72, the packings 81 can be further compressed against the pipe by jacking the respective push rings 79 towards the center ring 76 with the thrust screws 91.

Although the preferred embodiments of this invention have been shown and described, it should be understood that various modifications and rearrangements of the parts may be resorted to without departing from the scope of the invention as disclosed and claimed herein.

What is claimed is:

1. A fitting assembly for mechanically coupling a plain pipe end comprising a forged ASA type slip-on flange, the slip-on flange including a disc portion having an axial major through bore and a plurality of bolt holes equally spaced radially from the disc axis and equally spaced angularly from one another; the slip-on flange having a mating face on one side of the disc portion and a hub on the opposite side of the disc portion, the length of the hub being generally equal to one-half or less of the length of the disc portion, means forming a conical collet bore adjacent the mating face side of the disc portion, the collet bore having a decreasing radius in a direction towards the hub side of the disc portion, a wedge collar received in the collet bore, the wedge collar having circumferentially arranged elements with radially outer surfaces complimentary to the collet bore and radially inner surfaces adapted to engage the exterior of the pipe, an annular body formed by another ASA forged flange of the same nominal size as the first mentioned flange having a bore adapted to receive the plain pipe end, an annular packing seat associated with said pipe end receiving bore, packing material in said packing seat surrounding said pipe adjacent said plain pipe end, an annular flange portion associated with said annular body, said flange portion having a plurality of bolt holes each aligned with one of the bolt holes in the slip-on flange, a tension bolt in each pair of aligned bolt holes, said bolts being arranged when tightened to draw said annular body towards said slip-on flange, means between said annular body and said wedge collar to cause said wedge collar to be driven into said collet bore as said annular body is drawn towards said slip-on flange, said wedge collar being cammed radially inwardly against the pipe as it is driven into the collet bore to thereby anchor the fitting assembly to the pipe.

2. A fitting assembly as set forth in claim 1, wherein said wedge collar driving means is arranged to axially compress said packing material as said wedge collar is driven into said collet bore.

3. A fitting assembly as set forth in claim 1, wherein at least a portion of said conical collet bore is formed in said mating face.

4. A fitting assembly as set forth in claim 1, wherein at least a portion of said conical bore is provided in an annular collet separate from said slip-on flange.

5. A fitting assembly as set forth in claim 4 wherein said annular collet includes a counterbore sized to fit on said mating face and thereby pilot said collet on said slip-on flange.

6. A fitting assembly as set forth in claim 1, wherein said annular body and said annular flange portion are formed of a forged ASA type welding neck flange of the same nominal size as said slip-on flange.

7. A fitting assembly as set forth in claim 6, wherein said plain pipe end receiving bore and said packing seat are machined in a coupling face of said welding neck flange.

8. A fitting assembly as set forth in claim 1, wherein said annular body is symmetrical about a radial plane at its mid-length, and adapted to receive opposed plain pipe ends at each of its ends, said slip-on flange, conical collet bore, wedge collar, packing material and wedge collar driving means being duplicated on opposite sides of said annular body, the duplicate slip-on flange providing said annular flange portion.

9. A fitting assembly as set forth in claim 1, including a push ring interposed between said slip-on flange and said packing material and thrust screws extending axially from said slip-on flange to said push ring, said thrust screws and push ring being adapted to axially compress said packing material into said seat.

10. A method of making a coupling for mechanically coupling the plain end of a pipe comprising the steps of providing a pair of circular forged ASA type flanges of the same nominal size with each flange having a plurality of axial bolt receiving holes circumferentially spaced about its periphery, at least one of said flanges being of the slip-on type with a bore adapted to slide axially onto the pipe end, a mating face on one side of the flange and a hub on the other side, the length of the hub being generally equal to or less than one-half of the length of the disc portion of the flange, providing means forming a conical bore adjacent the mating face of said slip-on flange concentric with the slip-on flange axis and decreasing in diameter in the direction defined from the mating face to the hub of the slip-on flange, providing a wedge ring with a conical outer periphery sized to be received in the conical bore and an interior sized to fit over the plain pipe end, forming in an annular body area associated with the other flange, a bore for receiving the plain end of the pipe and an annular packing seat for containing packing material around the periphery of the pipe, the flanges and wedge ring and collet bore being arranged such that when bolts assembled through the flange bolt holes are tightened the wedge ring is adapted to be cammed radially inwardly by the collet bore into tight gripping engagement with the outer periphery of the plain end pipe.

* * * * *